US012570280B2

(12) United States Patent
Okubo

(10) Patent No.: US 12,570,280 B2
(45) Date of Patent: Mar. 10, 2026

(54) VEHICLE COMPRISING VEHICLE CONTROL APPARATUS

(71) Applicant: TOYOTA JIDOSHA KABUSHIKI KAISHA, Toyota (JP)

(72) Inventor: Soichi Okubo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 18/676,751

(22) Filed: May 29, 2024

(65) Prior Publication Data

US 2025/0033632 A1    Jan. 30, 2025

(30) Foreign Application Priority Data

Jul. 26, 2023    (JP) .................................. 2023-121878

(51) Int. Cl.
*B60W 30/09* (2012.01)
*B60W 30/182* (2020.01)

(52) U.S. Cl.
CPC .......... *B60W 30/09* (2013.01); *B60W 30/182* (2013.01); *B60W 2420/40* (2013.01); *B60W 2520/10* (2013.01); *B60W 2554/804* (2020.02)

(58) Field of Classification Search
CPC ............... B60W 30/09; B60W 30/182; B60W 2420/40; B60W 2520/10; B60W 2554/804; B60W 2420/403; B60W 2420/408; B60W 2420/54; B60W 2554/00; B60W 60/00; G05D 1/00; G06V 20/58
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |

(Continued)

FOREIGN PATENT DOCUMENTS

| | | | | |
|---|---|---|---|---|
| CN | 110316195 B | * | 4/2025 | ............ B60W 50/10 |
| JP | 2016-192162 A | | 11/2016 | |

(Continued)

OTHER PUBLICATIONS

CN-110316195-B machine translation (Year: 2025).*

*Primary Examiner* — Angelina M Shudy
(74) *Attorney, Agent, or Firm* — Sughrue Mion, PLLC

(57)    ABSTRACT

A vehicle comprises a vehicle control apparatus which has a safety assistance function and a driving assistance function on condition that the safety assistance function is working. The safety assistance function is configured to work in one of first and second modes. The first mode is a mode of assisting safety of the vehicle based on first information detected by at least one first sensor, and the second mode is a mode of assisting the safety of the vehicle based on the first information and second information detected by at least one second sensor. The vehicle control apparatus activates the safety assistance function in the second mode and activates the driving assistance function when the at least one first sensor is not activated at a point of time when an activation of the driving assistance function is requested by an operator of the vehicle.

4 Claims, 3 Drawing Sheets

(56) References Cited

U.S. PATENT DOCUMENTS

| | | | |
|---|---|---|---|
| 9,174,643 B2 | 11/2015 | Aso | |
| 9,308,914 B1* | 4/2016 | Sun | B60W 60/0051 |
| 10,017,178 B2 | 7/2018 | Morimoto et al. | |
| 10,118,617 B2 | 11/2018 | Urano et al. | |
| 10,486,649 B1* | 11/2019 | Bennie | B60R 25/1004 |
| 10,486,698 B2 | 11/2019 | Masui et al. | |
| 11,167,768 B2* | 11/2021 | Shiraishi | B60W 60/007 |
| 11,247,665 B2* | 2/2022 | Limbacher | G01C 21/3626 |
| 11,891,076 B1* | 2/2024 | Lopez | B60W 60/0051 |
| 11,891,078 B1* | 2/2024 | Lopez | B60W 30/02 |
| 12,325,446 B2* | 6/2025 | Berghöfer | B60W 40/114 |
| 2007/0088488 A1* | 4/2007 | Reeves | G07C 5/085 |
| | | | 701/33.4 |
| 2007/0198145 A1* | 8/2007 | Norris | H04L 67/12 |
| | | | 701/23 |
| 2009/0204289 A1* | 8/2009 | Lehre | G01S 13/931 |
| | | | 701/36 |
| 2010/0036562 A1* | 2/2010 | Becker | B60W 30/16 |
| | | | 701/1 |
| 2014/0244105 A1* | 8/2014 | Dariush | B60W 40/04 |
| | | | 701/1 |
| 2014/0249722 A1* | 9/2014 | Hegemann | G08G 1/167 |
| | | | 701/1 |
| 2015/0032322 A1* | 1/2015 | Wimmer | B60W 50/082 |
| | | | 701/23 |
| 2015/0283998 A1* | 10/2015 | Lind | B60W 50/082 |
| | | | 701/23 |
| 2016/0187879 A1* | 6/2016 | Mere | B60W 30/12 |
| | | | 701/23 |
| 2017/0176208 A1* | 6/2017 | Chung | H04N 7/183 |
| 2017/0269593 A1* | 9/2017 | Letwin | B60W 60/0059 |
| 2017/0297587 A1* | 10/2017 | Mimura | B60W 30/182 |
| 2018/0022354 A1* | 1/2018 | Akatsuka | B62D 15/026 |
| | | | 701/41 |
| 2018/0093675 A1* | 4/2018 | Holub | B60W 60/0059 |
| 2018/0113461 A1* | 4/2018 | Potnis | B60W 60/0059 |
| 2018/0118204 A1 | 5/2018 | Ito et al. | |
| 2018/0154932 A1* | 6/2018 | Rakouth | B62D 1/286 |
| 2018/0257667 A1* | 9/2018 | Yoshii | B60W 60/0053 |
| 2018/0281781 A1* | 10/2018 | Kim | B60W 30/06 |
| 2018/0297555 A1* | 10/2018 | Simon | B62D 5/001 |
| 2018/0321674 A1* | 11/2018 | Chase | G05D 1/247 |
| 2019/0009791 A1* | 1/2019 | Hergeth | B60W 50/082 |
| 2019/0064799 A1* | 2/2019 | Amirloo Abolfathi | |
| | | | G05D 1/0055 |
| 2019/0118814 A1* | 4/2019 | Wood | H04W 4/38 |
| 2019/0163176 A1* | 5/2019 | Wang | G05D 1/0088 |
| 2019/0295419 A1 | 9/2019 | Tosa et al. | |
| 2019/0300013 A1* | 10/2019 | Shiraishi | B60W 30/12 |
| 2019/0317494 A1* | 10/2019 | Lee | B60W 50/082 |
| 2019/0354111 A1* | 11/2019 | Cheng | G05D 1/0011 |
| 2020/0156632 A1* | 5/2020 | Ding | G06N 3/0464 |
| 2020/0180436 A1* | 6/2020 | Obiagwu | G09G 3/3406 |
| 2020/0192366 A1* | 6/2020 | Levinson | G01S 15/931 |
| 2020/0238989 A1* | 7/2020 | Moon | B60W 10/06 |
| 2020/0239015 A1* | 7/2020 | Nishida | B60W 30/08 |
| 2020/0298844 A1 | 9/2020 | Ikuta et al. | |
| 2020/0324743 A1* | 10/2020 | Kennedy | B60Q 9/008 |
| 2020/0353919 A1* | 11/2020 | Kawabata | G01S 15/93 |
| 2020/0369274 A1 | 11/2020 | Mizuno et al. | |
| 2021/0001785 A1* | 1/2021 | Rose | B60W 40/08 |
| 2021/0179118 A1* | 6/2021 | Alt | G06N 3/006 |
| 2021/0188281 A1* | 6/2021 | Jung | B60S 1/0825 |
| 2021/0207969 A1* | 7/2021 | Bang | B60W 30/0956 |
| 2021/0300429 A1* | 9/2021 | Kim | G05D 1/81 |
| 2022/0073107 A1* | 3/2022 | Kim | G05D 1/0061 |
| 2022/0126832 A1* | 4/2022 | Ewert | B60W 10/24 |
| 2022/0169285 A1* | 6/2022 | Griffin | B60W 30/182 |
| 2022/0203932 A1* | 6/2022 | Martin | B60R 25/252 |
| 2022/0204043 A1* | 6/2022 | Xu | B60W 60/0051 |
| 2022/0206761 A1* | 6/2022 | Kuriyama | G06F 8/20 |
| 2022/0219692 A1* | 7/2022 | Taniguchi | B60W 30/12 |
| 2022/0281483 A1* | 9/2022 | Eriksson | B60W 50/082 |
| 2022/0297716 A1* | 9/2022 | Li | B60W 60/00253 |
| 2023/0136133 A1* | 5/2023 | Hidaka | G01C 21/3685 |
| | | | 701/26 |
| 2023/0168351 A1* | 6/2023 | O'Donnell | B60W 30/182 |
| | | | 702/159 |
| 2023/0182572 A1* | 6/2023 | Fujino | B60K 35/81 |
| | | | 701/36 |
| 2023/0192102 A1* | 6/2023 | Wiberg | B62D 15/0265 |
| | | | 701/26 |
| 2023/0202475 A1* | 6/2023 | Tsuchiya | B60W 30/146 |
| | | | 701/93 |
| 2023/0219569 A1* | 7/2023 | Zhao | B60W 60/001 |
| | | | 701/23 |
| 2023/0234599 A1* | 7/2023 | Tsuda | B60W 50/04 |
| | | | 701/23 |
| 2024/0124026 A1* | 4/2024 | Margosian | B60W 60/00186 |
| 2024/0217534 A1* | 7/2024 | Nakamura | B60W 30/16 |
| 2024/0270278 A1* | 8/2024 | Lee | B60W 50/10 |
| 2024/0270285 A1* | 8/2024 | Ucar | B60W 30/0956 |
| 2024/0278801 A1* | 8/2024 | Lee | B62D 15/0285 |
| 2024/0317267 A1* | 9/2024 | Bergquist | G06V 20/58 |
| 2024/0326746 A1* | 10/2024 | Maier | B60S 1/485 |
| 2024/0425072 A1* | 12/2024 | Lee | G01S 7/527 |
| 2025/0026286 A1* | 1/2025 | Teranishi | B60R 16/033 |
| 2025/0026288 A1* | 1/2025 | Shenoy | B60K 35/80 |
| 2025/0033632 A1* | 1/2025 | Okubo | B60W 30/09 |
| 2025/0050896 A1* | 2/2025 | Fan | B60W 60/0053 |
| 2025/0138624 A1* | 5/2025 | Kim | H04L 67/12 |
| 2025/0171014 A1* | 5/2025 | Okabe | B60W 50/14 |
| 2025/0242832 A1* | 7/2025 | Gunya | B60W 60/001 |
| 2025/0289452 A1* | 9/2025 | Yoshikawa | B60W 50/14 |
| 2025/0289453 A1* | 9/2025 | Yoshikawa | B60W 40/08 |

FOREIGN PATENT DOCUMENTS

| | | |
|---|---|---|
| JP | 2019-023008 A | 2/2019 |
| JP | 2019-137316 A | 8/2019 |
| JP | 2020-154758 A | 9/2020 |
| JP | 2021-094970 A | 6/2021 |

* cited by examiner

VEHICLE COMPRISING VEHICLE CONTROL APPARATUS

CROSS-REFERENCE TO RELATED APPLICATIONS

This application claims priority to Japanese patent application No. JP 2023-121878 filed on Jul. 26, 2023, the content of which is hereby incorporated by reference in its entirety.

BACKGROUND

Field

The present invention relates to a vehicle comprising a vehicle control apparatus.

Description of the Related Art

There is known a vehicle comprising (i) a vision improving function of improving vision of a driver of the vehicle and (ii) a driving assistance function of assisting driving operations of driving the vehicle (for example, refer to JP 2021-94970 A). In the known vehicle, the vision improving function is, for example, a function of activating a defroster, and the driving assistance function is, for example, a function of assisting a steering operation of steering the vehicle to help the vehicle travel on a center line of a traffic lane.

In the known vehicle, when an operation for activating the vision improving function is carried out by the driver while the driving assistance function does not work, the driving assistance function starts to be activated. Thereby, when the operation for activating the vision improving function is carried out and thus, the driving operations of driving the vehicle should be assisted, a safety level of travelling of the vehicle is improved.

In a vehicle having a driving assistance function of assisting the driving operations of driving the vehicle and a safety assistance function of assisting ensuring safety of the vehicle, when the driving assistance function is configured to work on condition that the safety assistance function is working, the safety assistance function should be activated in order for the driving assistance function to work in response to an activation of the driving assistance function being requested. In this regard, when (i) the safety assistance function is configured to use information detected by a certain sensor, and (ii) the sensor has low detection accuracy, the safety assistance function may experience false activation. Therefore, an operator of the vehicle sometimes experiences annoyance and disenables the safety assistance function. In view of the circumstances, the operator of the vehicle may experience annoyance when the safety assistance function starts to be activated in response to the activation of the driving assistance function being requested.

SUMMARY

An object of the present invention is to provide a vehicle comprising a vehicle control apparatus which can prevent the operator of the vehicle from experiencing annoyance when the vehicle control apparatus activates the safety assistance function in response to the activation of the driving assistance function being requested.

A vehicle according to the present invention comprises a vehicle control apparatus which has (i) a safety assistance function of assisting ensuring safety of the vehicle and (ii)

a driving assistance function of assisting driving operations of driving the vehicle on condition that the safety assistance function is working. The safety assistance function is configured to work in one of a first mode and a second mode. The first mode is a mode of assisting the safety of the vehicle based on first information detected by at least one first sensor. The second mode is a mode of assisting the safety of the vehicle based on the first information and second information detected by at least one second sensor different from the at least one first sensor. The vehicle control apparatus is configured to activate the safety assistance function in the second mode and activate the driving assistance function when the at least one first sensor is not activated at a point of time when an activation of the driving assistance function is requested by an operator of the vehicle.

When the driving assistance function is configured to work on condition that the safety assistance function is working, the safety assistance function should be activated in order for the driving assistance function to work in response to an activation of the driving assistance function being requested. In this regard, when (i) the safety assistance function uses information detected by the at least one first sensor only, and (ii) the at least one first sensor has low detection accuracy, the safety assistance function may experience false activation. Therefore, the operator of the vehicle sometimes experiences annoyance and disenables the safety assistance function. In view of the circumstances, the operator of the vehicle may experience annoyance when the safety assistance function starts to be activated in response to the activation of the driving assistance function being requested.

The vehicle control apparatus of the vehicle according to the present invention activates the safety assistance function in the second mode using (i) the information detected by the at least one first sensor and (ii) the information detected by the at least one second sensor and activates the driving assistance function when (i) the at least one first sensor is disenabled and thus, it can be presumed that the safety assistance function has been disenabled by the operator of the vehicle at the point of time when the activation of the driving assistance function is requested by the operator of the vehicle. That is, the vehicle control apparatus activates the driving assistance function by activating the safety assistance function. In addition, the vehicle control apparatus activates the safety assistance function in the second mode using (i) the information detected by the at least one first sensor and (ii) the information detected by the at least one second sensor and thus, the low detection accuracy of the at least one first sensor is compensated by the at least one second sensor. Thus, the vehicle control apparatus can prevent the operator of the vehicle from experiencing annoyance when the vehicle control apparatus activates the safety assistance function.

In the vehicle according to an aspect of the present invention, the at least one first sensor and the at least one second sensor may be activated when the safety assistance function works in the second mode.

In the vehicle according to this aspect of the present invention, the at least one first sensor and the at least one second sensor are activated when the safety assistance function works in the second mode. Thus, the low detection accuracy of the at least one first sensor can be surely compensated by the at least one second sensor.

In the vehicle according to another aspect of the present invention, the at least one first sensor may not be activated when the safety assistance function does not work.

In the vehicle according to this aspect of the present invention, the at least one first sensor is not activated when the safety assistance function does not work. Therefore, when the at least one first sensor is not activated, the safety assistance function does not work. Thus, the vehicle control apparatus can realize that the safety assistance function does not work based on a fact that the at least one first sensor is not activated.

In the vehicle according to further another aspect of the invention, the driving assistance function may be a function of automatically performing at least a part of the driving operations of driving the vehicle. The safety assistance function may be a function of preventing the vehicle from contacting or colliding with an object. The at least one first sensor may include a sound wave sensor. The at least one second sensor may include at least one of a radio wave sensor and an image sensor.

The detection accuracy of the sound sensor is decreased due to snow or the like on the sound sensor. In this case, when the safety assistance function is activated, the safety assistance function may experience false activation. Therefore, the operator of the vehicle sometimes experiences annoyance and disenables the safety assistance function.

The vehicle control apparatus of the vehicle according to this aspect of the present invention activates the safety assistance function in the second mode using the information detected by the sound sensor and the information detected by at least one of the radio wave sensor and the image sensor when the operator of the vehicle has disenabled the safety assistance function and requests the activation of the driving assistance function. Thus, the vehicle control apparatus can prevent the operator of the vehicle from experiencing annoyance when the vehicle control apparatus activates the safety assistance function.

Elements of the invention are not limited to elements of embodiments and modified examples of the invention described with reference to the drawings. The other objects, features and accompanied advantages of the invention can be easily understood from the embodiments and the modified examples of the invention.

DETAILED DESCRIPTION

Figure 1:
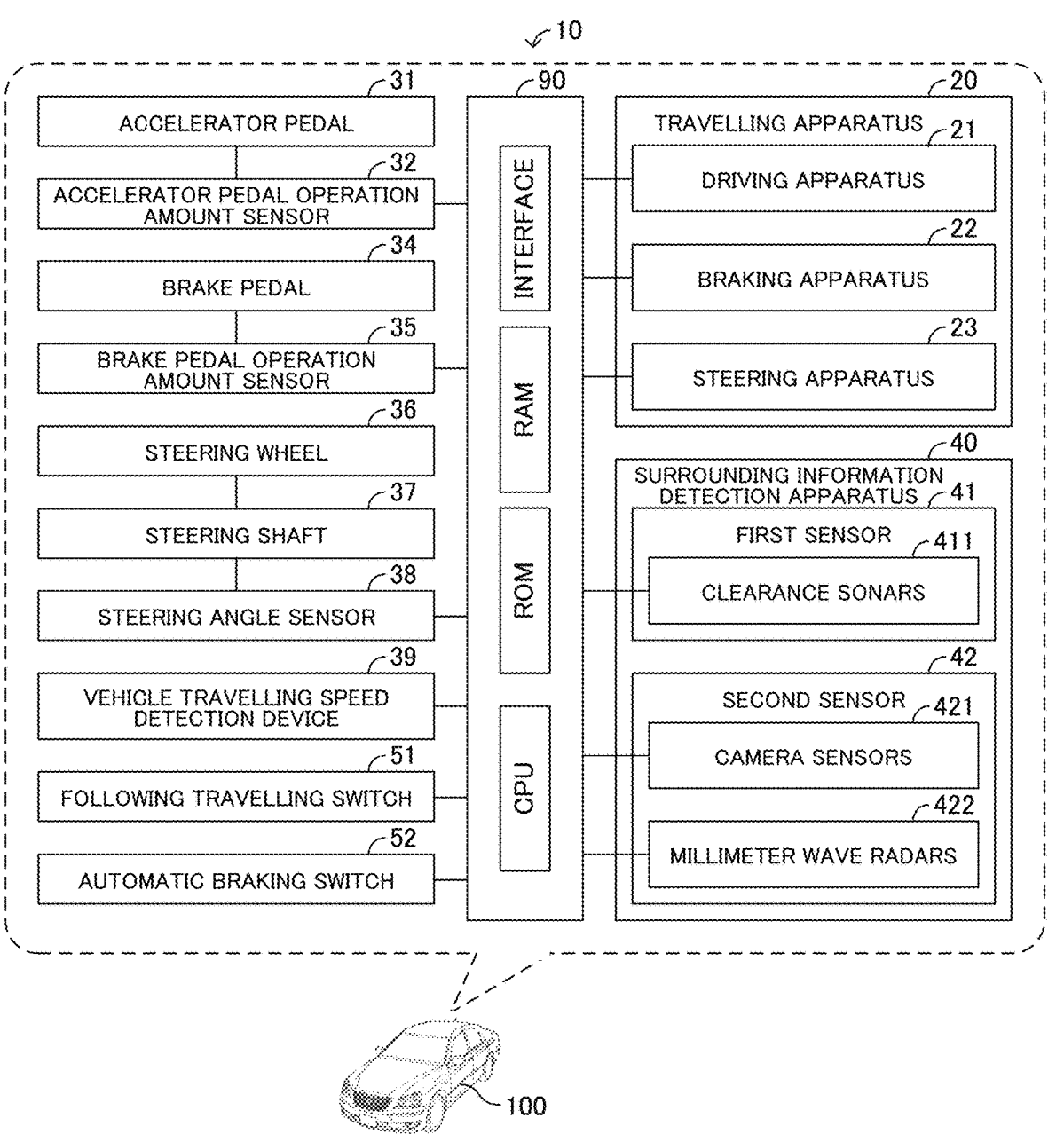
FIG. 1 is a view which shows a vehicle comprising a vehicle control apparatus according to an embodiment of the present invention.

Below, a vehicle according to an embodiment of the present invention will be described with reference to the drawings. FIG. 1 shows a vehicle 100 according to the embodiment of the present invention. In order to distinguish the vehicle 100 according to the embodiment of the present invention from other vehicles, the vehicle 100 according to the embodiment of the present invention is hereinafter referred to as "the own vehicle 100".

The own vehicle 100 is equipped with a vehicle control apparatus 10. Hereinafter, the vehicle control apparatus 10 will be described by exemplifying that an operator of the own vehicle 100 is a driver of the own vehicle 100, that is, a person who is in the own vehicle 100 and drives the own vehicle 100.

However, the operator of the own vehicle 100 may be a remote operator of the own vehicle 100, that is, a person who is not in the own vehicle 100 but remotely drives the own vehicle 100. When the operator of the own vehicle 100 is the remote operator, the vehicle control apparatuses 10 are mounted on the own vehicle 100 and a remote operation facility installed outside the own vehicle 100 for remotely driving the own vehicle 100, respectively and functions of the vehicle control apparatus 10 described below are realized by the vehicle control apparatus 10 mounted on the own vehicle 100 and the vehicle control apparatus 10 mounted on the remote operation facility.

As shown in FIG. 1, the vehicle control apparatus 10 includes an ECU (i.e., an electronic control unit) 90 as a control device. The ECU 90 includes a microcomputer as a main component. The microcomputer includes a CPU, a storage medium such as a ROM, a RAM and a non-volatile memory, an interface, and the like. The CPU is configured or programmed to realize various functions by executing instructions, programs, or routines stored in the storage medium. In particular, in the present embodiment, the vehicle control apparatus 10 stores, in a storage medium, programs for realizing various kinds of controls executed by the vehicle control apparatus 10.

In the present embodiment, the vehicle control apparatus 10 includes only one ECU 90, but may include a plurality of the ECUs, and may be configured to share the functions of the vehicle control apparatus 10 described below by the respective ECU.

Further, the vehicle control apparatus 10 may be configured to be able to update the programs stored in the storage medium by wireless communication (for example, Internet communication) with external devices.

The own vehicle 100 is equipped with a traveling device 20. The traveling device 20 includes a driving apparatus 21, a braking apparatus 22, and a steering apparatus 23.

The driving apparatus 21 is an apparatus which outputs a driving force (or a driving torque) applied to the own vehicle 100 for moving the own vehicle 100, and includes, for example, an internal combustion engine, an electric motor, or the like. The driving apparatus 21 is electrically connected to the ECU 90. The vehicle control apparatus 10 controls the driving force output from the driving apparatus 21 by controlling operations of the driving apparatus 21.

The braking apparatus 22 is an apparatus which outputs a braking force (or a braking torque) applied to the own vehicle 100 for braking the own vehicle 100, and includes, for example, a hydraulic braking apparatus. The braking apparatus 22 is electrically connected to the ECU 90. The vehicle control apparatus 10 controls the braking force output from the braking apparatus 22 by controlling operations of the braking apparatus 22.

The steering apparatus 23 is an apparatus which outputs a steering force (or a steering torque) applied to the own vehicle 100 for steering the own vehicle 100, and includes, for example, a power steering device. The steering apparatus 23 is electrically connected to the ECU 90. The vehicle control apparatus 10 controls the steering force output from the steering apparatus 23 by controlling operations of the steering apparatus 23.

Further, the own vehicle 100 is equipped with an accelerator pedal 31, an accelerator pedal operation amount sensor 32, a brake pedal 34, a brake pedal operation amount sensor 35, a steering wheel 36, a steering shaft 37, a steering angle sensor 38, a vehicle travelling speed detection device 39, and a surrounding information detection apparatus 40.

The accelerator pedal operation amount sensor 32 is a sensor which detects an operation amount of the accelerator pedal 31 and is electrically connected to the ECU 90. The vehicle control apparatus 10 acquires the operation amount of the accelerator pedal 31 as an accelerator pedal operation amount AP by the accelerator pedal operation amount sensor 32. The vehicle control apparatus 10 acquires a required driving force (or a required driving torque) based on the accelerator pedal operation amount AP and a traveling speed of the own vehicle 100, and controls the operations of the driving apparatus 21 such that the driving force corresponding to the required driving force is applied to the own vehicle 100 from the driving apparatus 21.

The brake pedal operation amount sensor 35 is a sensor which detects an operation amount of the brake pedal 34 and is electrically connected to the ECU 90. The vehicle control apparatus 10 acquires the operation amount of the brake pedal 34 as a brake pedal operation amount BP by the brake pedal operation amount sensor 35. The vehicle control apparatus 10 acquires a required braking force (or a required braking torque) based on the brake pedal operation amount BP, and controls the operations of the braking apparatus 22 such that the braking force corresponding to the required braking force is applied to the own vehicle 100 from the braking apparatus 22.

The steering angle sensor 38 is a sensor which detects a rotation angle of the steering shaft 37 with respect to its neutral position, and is electrically connected to the ECU 90. The vehicle control apparatus 10 acquires the rotation angle of the steering shaft 37 as a steering angle θ by the steering angle sensor 38.

The vehicle control apparatus 10 acquires a required steering force (or a required steering torque) based on the steering angle θ and the traveling speed of the own vehicle 100, and controls the operations of the steering apparatus 23 such that the steering force corresponding to the required steering force is applied to the own vehicle 100 from the steering apparatus 23.

The vehicle travelling speed detection device 39 is a device which detects the traveling speed of the own vehicle 100, and includes, for example, wheel rotation speed sensors. The vehicle travelling speed detection device 39 is electrically connected to the ECU 90. The vehicle control apparatus 10 acquires the traveling speed of the own vehicle 100 as an own vehicle travelling speed V by the vehicle travelling speed detection device 39.

The surrounding information detection apparatus 40 is an apparatus which detects information on a situation around the own vehicle 100, and includes at least one first sensor 41 and at least one second sensor 42 in the present embodiment.

In the present embodiment, the at least one first sensor 41 includes clearance sonars 411 as sound wave sensors. The clearance sonars 411 are electrically connected to the ECU 90. The vehicle control apparatus 10 acquires, as first information IF_1, an object information on objects around the own vehicle 100 by the clearance sonars 411.

In the present embodiment, the at least one second sensor 42 includes camera sensors 421 as image sensors and millimeter wave radars 422 as radio wave sensors. It should be noted that the at least one second sensor 42 may include one of the camera sensors 421 and the millimeter wave radars 422. The at least one second sensor 42 may include sensors other than the camera sensors 421 and the millimeter wave radars 422 as long as the sensors are different from the at least one first sensor 41.

The camera sensors 421 and the millimeter wave radar 422 are electrically connected to the ECU 90. The vehicle control apparatus 10 acquires image information on views around the own vehicle 100 as second information IF_2 by the camera sensors 421, and acquires object information on objects around the own vehicle 100 as the second information IF_2 by the millimeter wave radars 422.

It should be noted that the at least one first sensor 41 may include sensors other than the clearance sonars 411 as long as the sensors are different from the at least one second sensor 42.

The first information IF_1 is used by an automatic braking function described later. Further, the second information IF_2 is used by the automatic braking function and a following travelling control described later. The first information IF_1 may be used by the following travelling control.

The at least one first sensor 41 and the at least one second sensor 42 are not activated when the automatic braking function does not work. On the other hand, the at least one first sensor 41 and the at least one second sensor 42 are activated when the automatic braking function is working. The at least one first sensor 41 may be disenabled or enabled by an operation carried out by the driver.

Further, the own vehicle 100 is equipped with a following travelling switch 51 and an automatic braking switch 52.

The following travelling switch 51 is a switch which is operated by the driver of the own vehicle 100, and is electrically connected to the ECU 90. When the following travelling switch 51 is operated while the following travelling control is not executed, the vehicle control apparatus 10 determines that an execution of the following travelling control is requested. On the other hand, when the following travelling switch 51 is operated while the following travelling control is being executed, the vehicle control apparatus 10 determines that a stop of the execution of the following travelling control is requested.

The automatic braking switch 52 is also a switch which is operated by the driver of the own vehicle 100 and is electrically connected to the ECU 90. When the automatic braking switch 52 is operated while the automatic braking function does not work, the vehicle control apparatus 10 determines that an activation of the automatic braking function is requested. On the other hand, when the automatic braking switch 52 is operated while the automatic braking function is activated, the vehicle control apparatus 10 determines that a stop of the activation of the automatic braking function is requested.

<Operations of Vehicle Control Apparatus>

Next, operations of the vehicle control apparatus 10 will be described. The vehicle control apparatus 10 is configured to execute the following travelling control and activate the automatic braking function.

Figures 2A, 2B:
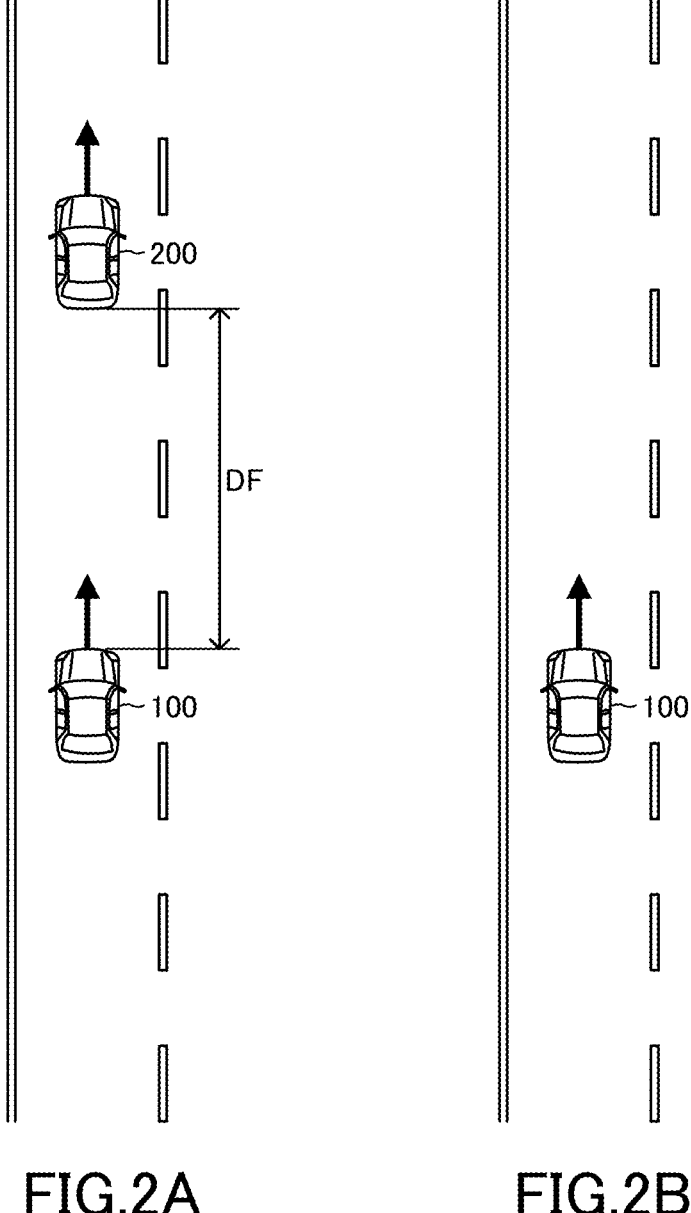
FIG. 2A is a view which shows a scene that a preceding vehicle exists.
FIG. 2B is a view which shows a scene that the preceding vehicle does not exist.

The following travelling control is a control of (i) automatically controlling acceleration and deceleration of the own vehicle 100 such that an inter-vehicle distance DF is maintained at a target distance Dtgt when a preceding vehicle 200 exists as shown in FIG. 2A, and (ii) automatically controlling the acceleration and deceleration of the own vehicle 100 such that the own vehicle travelling speed V is maintained at a set vehicle travelling speed Vset when the preceding vehicle 200 does not exist as shown in FIG. 2B.

The inter-vehicle distance DF is a distance between the own vehicle 100 and the preceding vehicle 200. In the present embodiment, the vehicle control apparatus 10 acquires the inter-vehicle distance DF based on the second information IF_2 acquired from the at least one second sensor 42.

The following travelling control is one of automatic driving controls of automatically performing at least a part of driving operations carried out by the driver to drive the own vehicle 100. Further, the following travelling control is also one of driving assistance controls of activating a driving assistance function, i.e., a function of assisting the driving operations carried out by the driver to drive the own vehicle 100. It should be noted that the driving assistance control includes, for example, a lane keeping control and a lane departure prevention control in addition to the following travelling control. The lane keeping control is a control of assisting a steering operation carried out by the driver to steer the own vehicle 100 such that the own vehicle 100 travels on a center line of a traffic lane. The lane departure prevention control is a control of assisting the steering operation carried out by the driver to steer the own vehicle 100 such that the own vehicle 100 travels toward the center line of the traffic lane when the own vehicle 100 is likely to depart from the traffic lane.

In addition, the automatic braking function is one of safety assistance functions of monitoring whether the own vehicle 100 contacts or collides with the object, and preventing the own vehicle 100 from contacting or colliding with the object by automatically braking and stopping the own vehicle 100 when the vehicle control apparatus 10 determines that the own vehicle 100 contacts or collides with the object. In other words, the automatic braking function is one of the safety assistance functions of preventing the own vehicle 100 from contacting or colliding with the object by monitoring whether the own vehicle 100 contacts or collides with the object and executing the automatic braking control of automatically braking and stopping the own vehicle 100 when the vehicle control apparatus 10 determines that the own vehicle 100 contacts or collides with the object.

For example, when (i) the automatic braking function is activated, and (ii) the vehicle control apparatus 10 determines that the own vehicle 100 contacts the object such as a column in a parking lot while the driver is driving the own vehicle 100 to park the own vehicle 100 in the parking lot, the automatic braking control is executed, and the own vehicle 100 is automatically stopped. Also, for example, when (i) the automatic braking function is activated, and (ii) the vehicle control apparatus 10 determines that the own vehicle 100 collides with the object such as another vehicle stopping ahead while the own vehicle 100 is travelling normally, the automatic braking control is executed, and the own vehicle 100 is automatically stopped.

The automatic braking function is configured to work in one of a first mode and a second mode.

The first mode is a mode of assisting ensuring safety of the own vehicle 100 based only on the first information IF_1 acquired from the at least one first sensor 41 (i.e., the clearance sonars 411). More specifically, the first mode is a mode in which only the first information IF_1 is used to determine whether the own vehicle 100 contacts or collides with the object.

The second mode is a mode of assisting ensuring the safety of the own vehicle 100 based on the first information IF_1 acquired from the at least one first sensor 41 (i.e., the clearance sonars 411) and the second information IF_2 acquired from the at least one second sensor 42 (i.e., the camera sensors 421 and the millimeter wave radars 422). More specifically, the second mode is a mode in which the first information IF_1 and the second information IF_2 are used to determine whether the own vehicle 100 contacts or collides with the object.

When the automatic braking function is activated in the first mode, the vehicle control apparatus 10 determines whether the own vehicle 100 contacts or collides with the object based on only the first information IF_1 acquired from the at least one first sensor 41. On the other hand, when the automatic braking function is activated in the second mode, the vehicle control apparatus 10 determines whether the own vehicle 100 contacts or collides with the object based on the first information IF_1 acquired from the at least one first sensor 41 and the second information IF_2 acquired from the at least one second sensor 42.

The automatic braking function may be activated in the first mode or in the second mode for various reasons, in particular, relating to detection accuracy of the at least one first sensor 41 and detection accuracy of the at least one second sensor 42.

The automatic braking function is one of the safety assistance functions of automatically driving the own vehicle 100 in order to assist ensuring safety related to travelling of the own vehicle 100. The safety assistance function includes, for example, a collision steering avoidance function in addition to the automatic braking function. The collision steering avoidance function is a function of monitoring whether the own vehicle 100 collides with an object ahead, and preventing the own vehicle 100 from colliding with the object by executing a collision steering avoidance control of automatically steering the own vehicle 100 such that the own vehicle 100 passes by the object, avoiding the object when the vehicle control apparatus 10 determines that the own vehicle 100 collides with the object ahead.

It should be noted that in the present embodiment, the following travelling control is executed on condition that the automatic braking function works.

Figure 3:
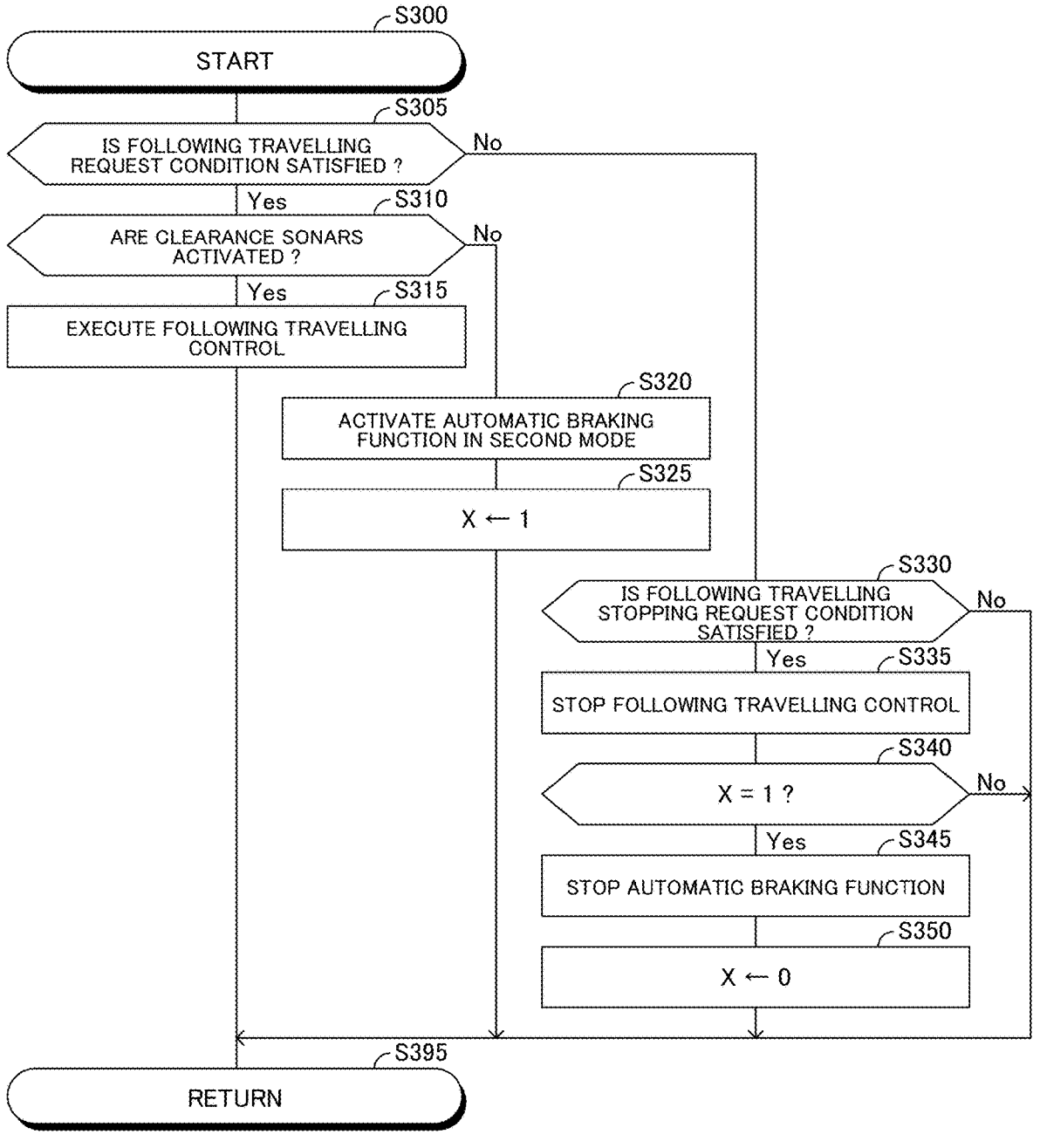
FIG. 3 is a view which shows a flowchart of a routine executed by the vehicle control apparatus according to the embodiment of the present invention.

The vehicle control apparatus 10 is configured to execute a routine shown in FIG. 3 at a predetermined calculation cycle and execute the following travelling control and activate the automatic braking function when a predetermined condition becomes satisfied.

When a predetermined timing is reached, the vehicle control apparatus 10 starts a process from a step S300 of the routine shown in FIG. 3 and proceeds with the process to a step S305 to determine whether or not a following travelling execution request condition Cstart is satisfied. The following travel execution request condition Cstart is a condition that the following travelling switch 51 is operated when the following travelling control is not executed. Therefore, the vehicle control apparatus 10 determines whether or not the execution of the following travelling control is requested (that is, whether or not an activation of the driving assistance function is requested) at the step S305.

When the vehicle control apparatus 10 determines "Yes" at the step S305, the vehicle control apparatus 10 proceeds with the process to a step S310 to determine whether or not the clearance sonars 411 are activated. In the present embodiment, since the clearance sonars 411 are activated when the automatic braking function works, the vehicle control apparatus 10 determines whether or not the automatic braking function works at the step S310.

When the vehicle control apparatus 10 determines "Yes" at the step S310, the vehicle control apparatus 10 proceeds with the process to a step S315 to start to execute the following travelling control. Next, the vehicle control apparatus 10 proceeds with the process to a step S395 to terminate executing this routine once.

On the other hand, when the vehicle control apparatus 10 determines "No" at the step S310, the vehicle control apparatus 10 proceeds with the process to a step S320 to activate the automatic braking function in the second mode. Next, the vehicle control apparatus 10 proceeds with the process to a step S325 to set a value of a forced activation flag X to "1". Next, the vehicle control apparatus 10 proceeds with the process to the step S395 to terminate executing this routine once. As a result, when the vehicle control apparatus 10 proceeds with the process to the step S310 next time, the vehicle control apparatus 10 determines "Yes" and proceeds with the process to the step S315 to start to execute the following travelling control.

Further, when the vehicle control apparatus 10 determines "No" at the step S305, the vehicle control apparatus 10 proceeds with the process to a step S330 to determine whether or not a following travelling stopping request condition Cstop is satisfied. The following travelling stopping request condition Cstop is a condition that the following travelling switch 51 is operated when the following travelling control is being executed.

When the vehicle control apparatus 10 determines "Yes" at the step S330, the vehicle control apparatus 10 proceeds with the process to a step S335 to stop executing the following travelling control. Next, the vehicle control apparatus 10 proceeds with the process to the step S340 to determine whether or not the forced activation flag X is "1".

When the vehicle control apparatus 10 determines "Yes" at the step S340, the vehicle control apparatus 10 proceeds with the process to a step S345 to stop activating the automatic braking function. That is, the vehicle control apparatus 10 deactivates the automatic braking function. Next, the vehicle control apparatus 10 proceeds with the process to a step S350 to set the value of the forced activation flag X to "0". Next, the vehicle control apparatus 10 proceeds with the process to the step S395 to terminate executing this routine once.

Further, when the vehicle control apparatus 10 determines "No" at the step S330 or the step S340, the vehicle control apparatus 10 proceeds with the process directly to the step S395 to terminate executing this routine once.

The operations of the vehicle control apparatus 10 have been described.

The driver may disenable the automatic braking function for various reasons. For example, when snow or the like adheres to the clearance sonars 411, detection accuracy of the clearance sonars 411 may decrease. In this case, when the automatic braking function is activated, the automatic braking control may be erroneously executed. For this reason, the driver may disenable the automatic braking function.

When the automatic braking function is disenabled as described above, and as in the present embodiment, not only the clearance sonars 411 but also the camera sensors 421 and the millimeter wave radars 422 used for the following travelling control are configured to be disactivated, the following travelling control is not executed when the driver operates the following travelling switch 51 in order to execute the following travelling control since the camera sensors 421 and the millimeter wave radars 422 are deactivated.

At this time, for example, when a switch for activating the camera sensors 421 and the millimeter wave radars 422 is separately provided, the driver can activate the camera sensors 421 and the millimeter wave radars 422 by operating the switch. However, it is necessary to operate the switch, and there is a possibility that the driver experiences annoyance.

In the case where the following travelling control is executed on condition that the automatic braking function is activated, in order to execute the following travelling control when the execution of the following travelling control is requested, it is necessary to activate the automatic braking function. On the other hand, in the case where the automatic braking function uses the information detected by the at least one first sensor 41 (the clearance sonars 411) only, when the detection accuracy of the at least one first sensor 41 is low, the automatic braking function may experience false activation. Therefore, the driver sometimes experiences annoyance and disenable the automatic braking function. In view of the circumstances, the driver may experience annoyance when the automatic braking function is activated in response to the execution of the following travelling control being requested.

According to the vehicle control apparatus 10, in the case where (i) the at least one first sensor 41 (i.e., the clearance sonars 411) is not activated, and (ii) the automatic braking function is disenabled by the driver when the driver requests the execution of the following travelling control, the automatic braking function is activated in the second mode using (i) the information detected by the at least one first sensor 41 and (ii) the information detected by the at least one second sensor 42 (i.e., the camera sensors 421 and the millimeter wave radars 422), and the following travelling control is executed. That is, the following travelling control can be executed by activating the automatic braking function. Moreover, since the automatic braking function is activated in the second mode using (i) the information detected by the at least one first sensor 41 and (ii) the information detected by the at least one second sensor 42, the low detection accuracy of the at least one first sensor 41 is compensated by the at least one second sensor 42. Therefore, even when the automatic braking function is activated, the vehicle control apparatus 10 can prevent the driver from experiencing annoyance.

It should be noted that the present invention is not limited to the above-described embodiments, and various modifications can be adopted within the scope of the present invention.

What is claimed is:

1. A vehicle, comprising:
   a vehicle control apparatus including an electronic control unit configured to execute (i) a safety assistance function of assisting ensuring safety of the vehicle and (ii) a driving assistance function of assisting driving operations of driving the vehicle on condition that the safety assistance function is executed,
   the electronic control unit being configured to execute the safety assistance function in one of a first mode and a second mode,
   the first mode being a mode of assisting the safety of the vehicle based on first information detected by at least one first sensor, and
   the second mode being a mode of assisting the safety of the vehicle based on the first information and second information detected by at least one second sensor different from the at least one first sensor,
   wherein the electronic control unit executes the safety assistance function in the second mode and executes the driving assistance function when the at least one first sensor is not activated at a point of time when an execution of the driving assistance function is requested by an operator of the vehicle, wherein the driving assistance function is a function of automatically performing at least a part of the driving operations of driving the vehicle.

2. The vehicle according to claim 1, wherein the at least one first sensor and the at least one second sensor are activated when the electronic control unit executes the safety assistance function in the second mode.

3. The vehicle according to claim 1, wherein the at least one first sensor is not activated when the electronic control unit does not execute the safety assistance function.

4. The vehicle according to claim 1, wherein the safety assistance function is a function of preventing the vehicle from contacting or colliding with an object, wherein the at least one first sensor includes a sound wave sensor, and wherein the at least one second sensor includes at least one of a radio wave sensor and an image sensor.

\* \* \* \* \*